United States Patent
Wang

(10) Patent No.: US 9,321,500 B2
(45) Date of Patent: Apr. 26, 2016

(54) FOLDING DEVICE FOR VEHICLE

(71) Applicant: Yao-Chin Wang, Taichung (TW)

(72) Inventor: Yao-Chin Wang, Taichung (TW)

(*) Notice: Subject to any disclaimer, the term of this patent is extended or adjusted under 35 U.S.C. 154(b) by 206 days.

(21) Appl. No.: 14/253,919

(22) Filed: Apr. 16, 2014

(65) Prior Publication Data

US 2015/0042065 A1   Feb. 12, 2015

(30) Foreign Application Priority Data

Aug. 12, 2013  (TW) .............. 102128806 A

(51) Int. Cl.
 B62K 15/00  (2006.01)
 F16B 2/18  (2006.01)

(52) U.S. Cl.
 CPC ............. *B62K 15/008* (2013.01); *B62K 15/006* (2013.01); *F16B 2/185* (2013.01)

(58) Field of Classification Search
 CPC .... B62K 15/006; B62K 15/008; B62K 15/00; B62K 2015/001; B62K 9/02; Y10T 403/32319; Y10T 403/32418; Y10T 403/60; Y10T 403/602; Y10T 403/599; F16L 37/1205; F16L 37/00; F16L 37/20; F16L 23/06
 USPC ............ 403/321, 322.4, 49, 92, 102; 280/287
 See application file for complete search history.

(56) References Cited

U.S. PATENT DOCUMENTS

| | | | | |
|---|---|---|---|---|
| 2,394,494 A | * | 2/1946 | Schwinn ............. | B62K 15/006 280/178 |
| 2,777,711 A | * | 1/1957 | Yokomaki ............ | B62K 15/006 280/287 |
| 4,440,414 A | * | 4/1984 | Wang .................. | B62K 15/008 280/278 |
| 4,842,292 A | * | 6/1989 | Wang .................. | B62K 15/008 280/278 |
| 5,440,948 A | * | 8/1995 | Cheng ................. | B62K 15/006 280/278 |
| 5,906,452 A | * | 5/1999 | Lee ...................... | B62K 15/006 280/278 |
| 6,116,629 A | * | 9/2000 | Koppensteiner ..... | B62K 25/005 280/278 |
| 6,565,069 B2 | * | 5/2003 | Morris ................ | E04F 11/1836 256/65.15 |
| 7,828,312 B1 | * | 11/2010 | Yeh ...................... | B62K 15/006 280/278 |
| 2014/0203550 A1 | * | 7/2014 | Utsch .................. | F16L 37/1205 285/308 |

* cited by examiner

*Primary Examiner* — Joseph Rocca
*Assistant Examiner* — Daniel Yeagley
(74) *Attorney, Agent, or Firm* — Alan D. Kamrath; Kamrath IP Lawfirm, P.A.

(57) ABSTRACT

A folding device includes a main body, two connecting members respectively pivotally connected to the main body, and a locking assembly. Each connecting member includes an engaging portion. The locking assembly includes first and second hooking members, a lever, and an axial member. The first hooking member and the lever are pivotally connected to the main body. The axial member is inserted through the main body, the first hooking member and the lever. The second hooking member is pivotally connected to the lever. The first hooking member includes a first hooking portion, and the second hooking member includes a second hooking portion. The lever is pivotable with respect to the main body between locking and releasing positions.

14 Claims, 17 Drawing Sheets

FOLDING DEVICE FOR VEHICLE

BACKGROUND OF THE INVENTION

1. Field of the Invention

The present invention relates to a folding device and, in particular, to a folding device able to be mounted on a vehicle for folding and/or locking front and rear frames of the vehicle.

2. Description of the Related Art

In order to save storage space and facilitate carrying, the current trend is to build folding vehicles, such as folding bicycles or electric folding bicycles, and in order to meet different requirements in respect of folding, various folding devices have been designed on the foldable vehicles, among which folding, unfolding and locking devices are the most commonly used.

Further, the conventional folding device substantially includes two linking members and a quick release skewer. The two linking members are respectively jointed to front and rear frames of the folding vehicle by welded or other connection means, and the two linking members are pivotally connected with each other by means of a suitable mechanism. The quick release skewer includes a rod threaded on one end and with a lever operated cam assembly on the other. The rod is inserted into the two linking members, a nut is threaded on, and the lever can be closed to selectively tighten the cam and secure the two linking members to each other.

However, when the two linking member are intend to pivot with each other for folding, a user must open and rotate the lever and then pull the rod out from the two linking members to loosen the cam. The operation of the conventional folding device is monstrously complicated, and the connection strength between the two linking member is not strong enough.

The present invention is, therefore, intended to obviate or at least alleviate the problems encountered in the prior art.

SUMMARY OF THE INVENTION

It is therefore an object of the present invention to provide a folding device, which can be mounted on a vehicle for folding and/or locking front and rear frames of the vehicle.

The problem described above is solved, according to the invention by a folding device having features of claim 1.

Accordingly a folding device is provided, which comprises:

a main body respectively pivotally connected to and abuttable against two opposite ends of the main body including an engaging portion including first and second hooking members and the lever pivotally connected to the main body inserted through the main body and the lever pivotally connected to the lever including a first hooking portion including a second hooking portion pivotable with respect to the main body between locking and releasing positions;

wherein when the two connecting members are abutted against the main body is in the locking position, the engaging portion of one of the two connecting members is engaged with the first hooking portion of the first hooking member of the other connecting member is engaged with the second hooking portion of the second hooking member is in the releasing position, the two engaging portions of the two connecting members are respectively disengaged from the first and second hooking portions.

The idea underlying the present invention is that, by controlling the locking assembly to control the two connecting members to be pivotable with respect to the main body.

According to an advantageous improvement of the folding device according to the invention, the main body includes two first pivoting portions includes two fixed portions and an eccentric portion disposed at two opposite ends of the axial member and inserted through the lever connected between the two fixed portions and inserted through the two first pivoting portions and the first hooking member.

According to a further preferred development of the folding device of the invention, the first hooking member includes an axial hole of the axial member mounted into the axial hole less than an inner diameter of the axial hole.

According to another preferred development of the folding device of the invention, the first hooking member includes an axial hole of the axial member mounted into the axial hole less than an inner diameter of the axial hole.

In accordance with another preferred development, the lever includes two third pivoting portions disposed corresponding to the two first pivoting portions of the main body, with the first hooking member disposed between the two first pivoting portions, with the two first pivoting portions disposed between the two third pivoting portions.

According to a further enhancement of the folding device according to the invention, the second hooking member includes two second pivoting portions, with the lever disposed between the two second pivoting portions.

According to another improvement of the folding device according to the invention, the lever includes two pivoting holes each formed at each of the two third pivoting portions, with the two fixed portions of the axial member inserted through the two pivoting holes, wherein a cross section of one of the two pivoting holes and a cross section of one of the two fixed portions are noncircular and corresponded to each other.

According to an improvement, the locking assembly further includes a control member and a biasing member, wherein the first hooking member has a first abutting portion disposed at one end thereof opposite to the axial hole, wherein the lever has a sliding slot, with the control member slidably mounted in the sliding slot and including a second abutting portion and a recess, with the second abutting portion abuttable against the first abutting portion, with the biasing member received within the recess and biasing between an internal wall of the recess and an internal wall of sliding slot, wherein the control member movable with respect to the lever between locked and releasing positions;

wherein when the control member is in the locked position, the first abutting portion is engaged with the second abutting portion to cause the lever unable to pivot with respect to the main body;

wherein when the control member is in the releasing position, the biasing member is squeezed and the second abutting portion disengaged from the first abutting portion to cause the lever pivotable with respect to the main body.

According to a further development, the main body includes two connecting holes, wherein each of the two connecting members has a connecting portion disposed at an end face thereof adjacent to the main body, wherein an inter periphery of each of the two connecting holes has a first abutting face, wherein an outer periphery of each of the two connecting portions has a second abutting face, wherein the first and second abutting faces are inclined faces and abuttable against each other, with each of the two connecting portions receivable in each of the two connecting holes.

According to one particularly preferred development, each end of the main body has a positioning recess connected with each of the two connecting holes, wherein each of the two connecting members has a positioning portion engageable with the positioning recess of each end of the main body, wherein when the two connecting members are pivotally abutted against the two opposite ends of the main body, the positioning portion of each of the two connecting members is engaged into the positioning recess of each end of the main body.

According to a variant of the preceding development, a first spring is mounted between the first hooking member and the main body, and wherein a second spring is mounted between the second hooking member and the main body.

According to a further enhancement, the main body has two first lugs disposed at each end thereof, wherein each of the two connecting members has a second lug disposed between the two first lugs of each end of the main body, wherein two joining member respectively inserted through the second lug of each of the two connecting members and the two first lugs of each end of the main body.

In a development of the folding device further includes a positioning assembly, wherein the positioning assembly includes two rods, two coil spring, a cover, and two engaging members, with the two rods respectively moveably inserted through the main body, with the two coil spring respectively mounted around the two rods and disposed between the two rods and the main body, with the cover abutted against ends of the two rods, with the two engaging members connected to an end of each of the two rods opposite to the cover, wherein each of the two connecting members includes a guiding slot, with each of the two engaging members is slidaly engaged into the guiding slot of each of the two connecting members and movable between first and second positions.

According to a preferred improvement, the guiding slot includes first and second guiding sections formed therein and connected each other, with extending directions of the first and second guiding sections perpendicular to each other;

wherein when each of the two engaging members is in the first position, each of the two engaging members is disposed in the first guiding section of each of the two guiding slots, with the two connecting members positioned to the main body;

wherein when each of the two engaging members is in the second position, each of the two engaging members is disposed in the second guiding section of each of the two guiding slots, with the two connecting members pivotable with respect to the main body.

According to another preferred improvement, each of the two rods includes a limiting portion, a linking portion, a body portion, and a fixed hole, with the limiting and linking portions disposed at opposite ends of each of the two rods, with the body portion connected between the limiting and linking portions, with the fixed hole formed at the limiting portion, wherein the cover includes two through holes formed therethrough, and wherein two fixed members are respectively inserted through the two through holes and fixed into the two fixed holes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

An advantage of the present invention provides a folding device able to be mounted on a vehicle for folding and/or locking front and rear frames of the vehicle.

Other objects, advantages, and new features of the present invention will become apparent from the following detailed description of the invention when considered in conjunction with the accompanied drawings.

BRIEF DESCRIPTION OF THE DRAWINGS

The illustrative embodiments may best be described by reference to the accompanying drawings where.

Figure 1:
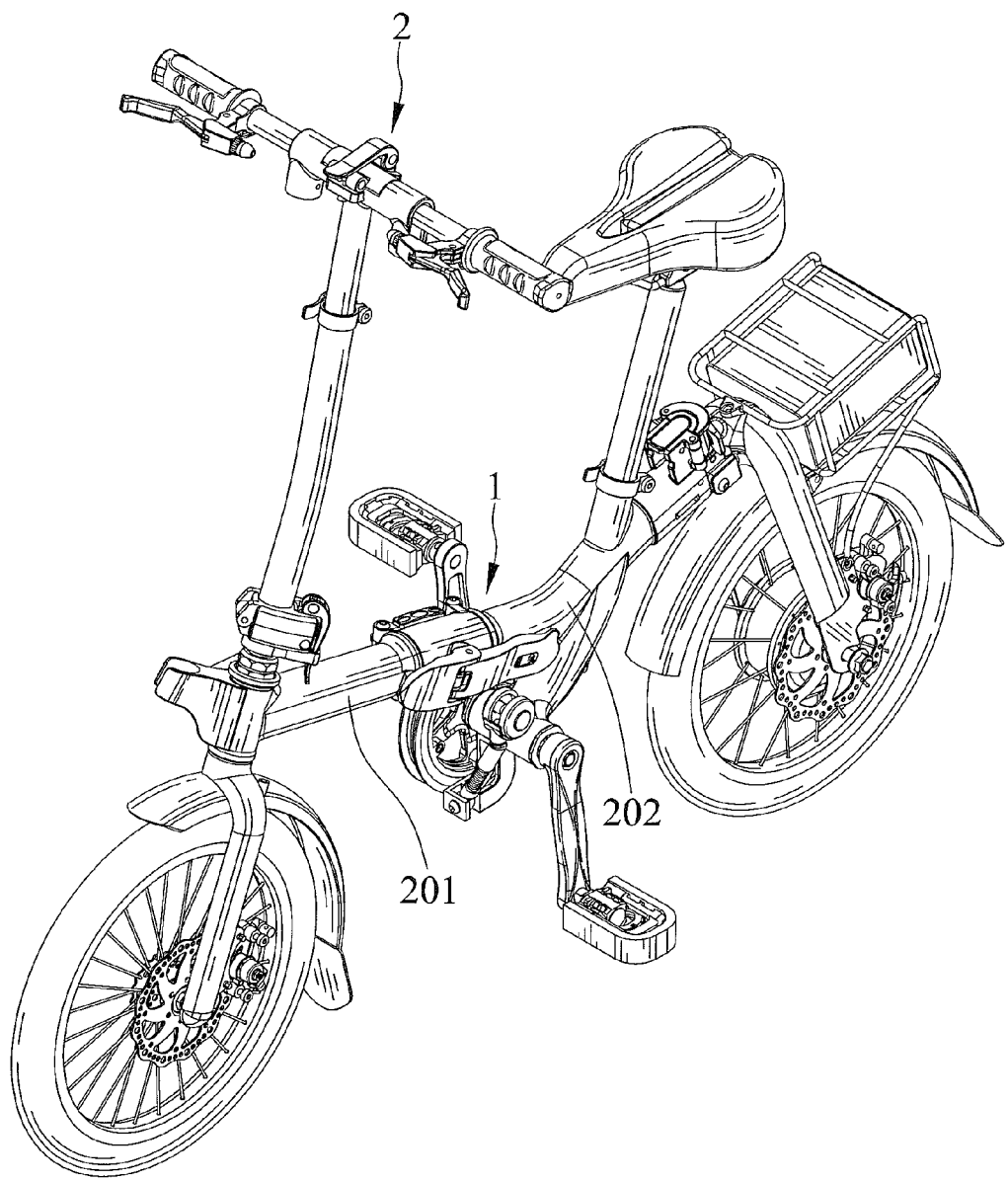
FIG. 1 shows a perspective view of a folding device in accordance with a first embodiment of the present invention and illustrates the folding device mounted on a folding bike which is in an unfolding state.
Figure 2:
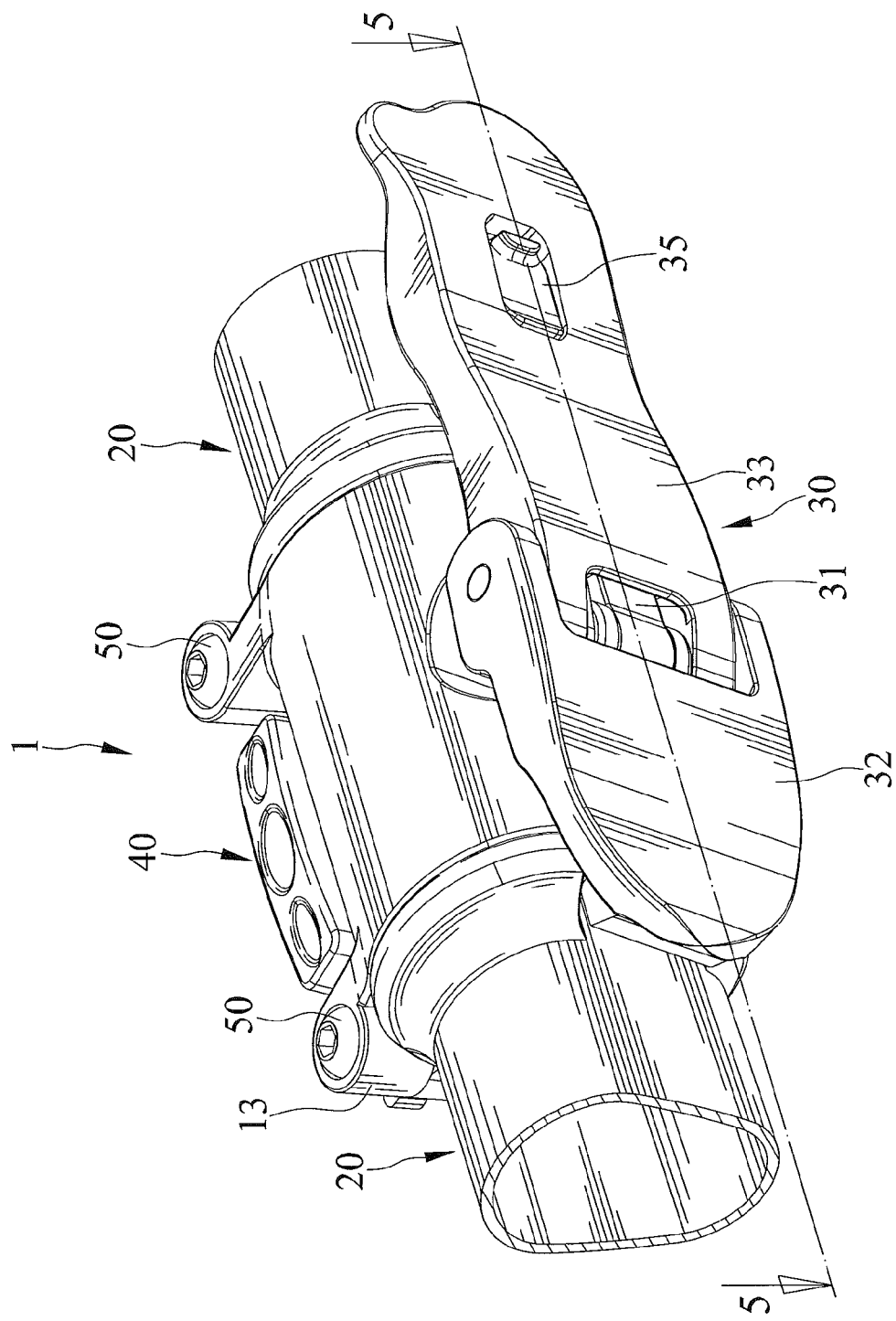
FIG. 2 shows a perspective view of the folding device in accordance with a first embodiment of the present invention.
Figure 3:
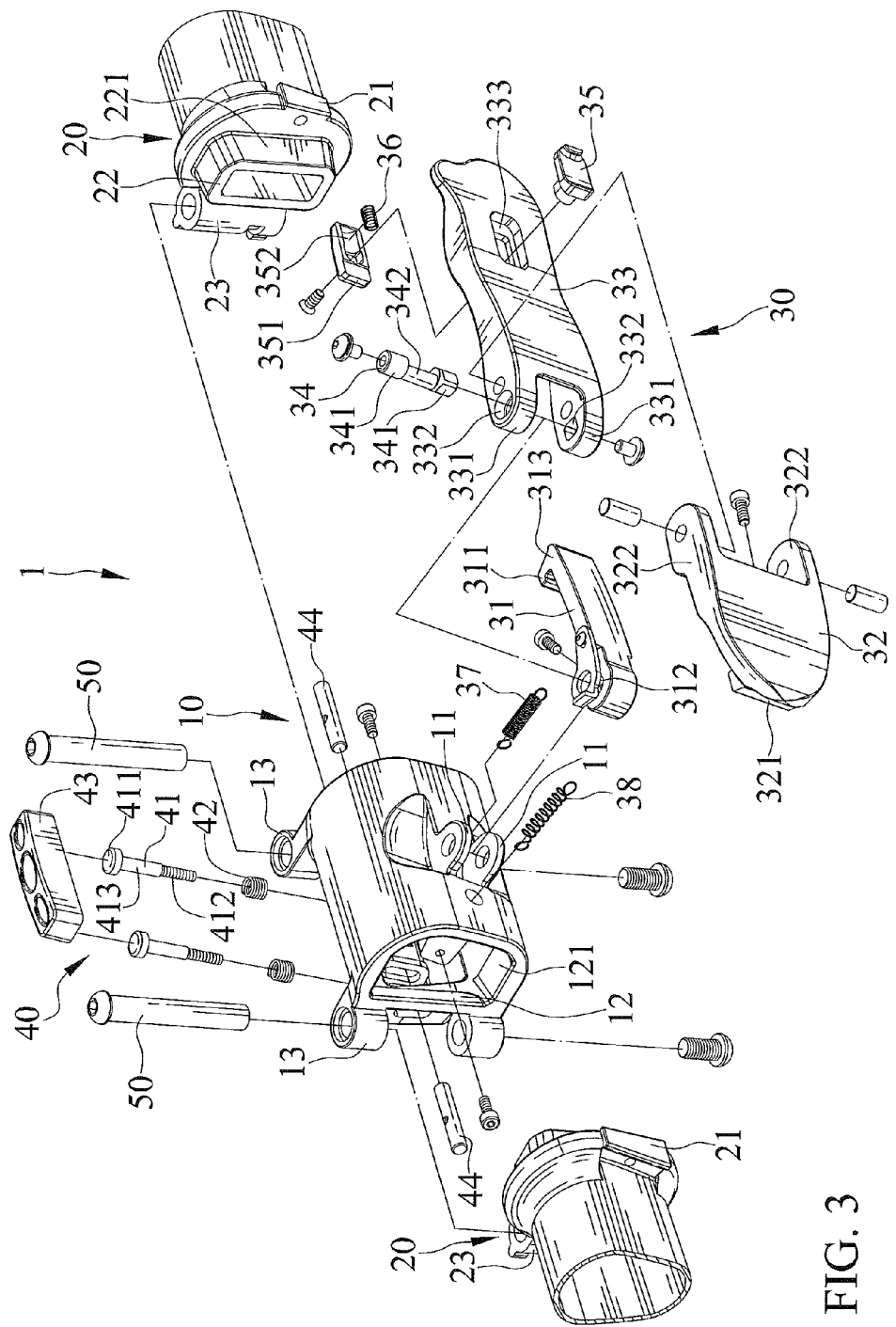
FIG. 3 shows an exploded view of the folding device of FIG. 2.
Figure 4:
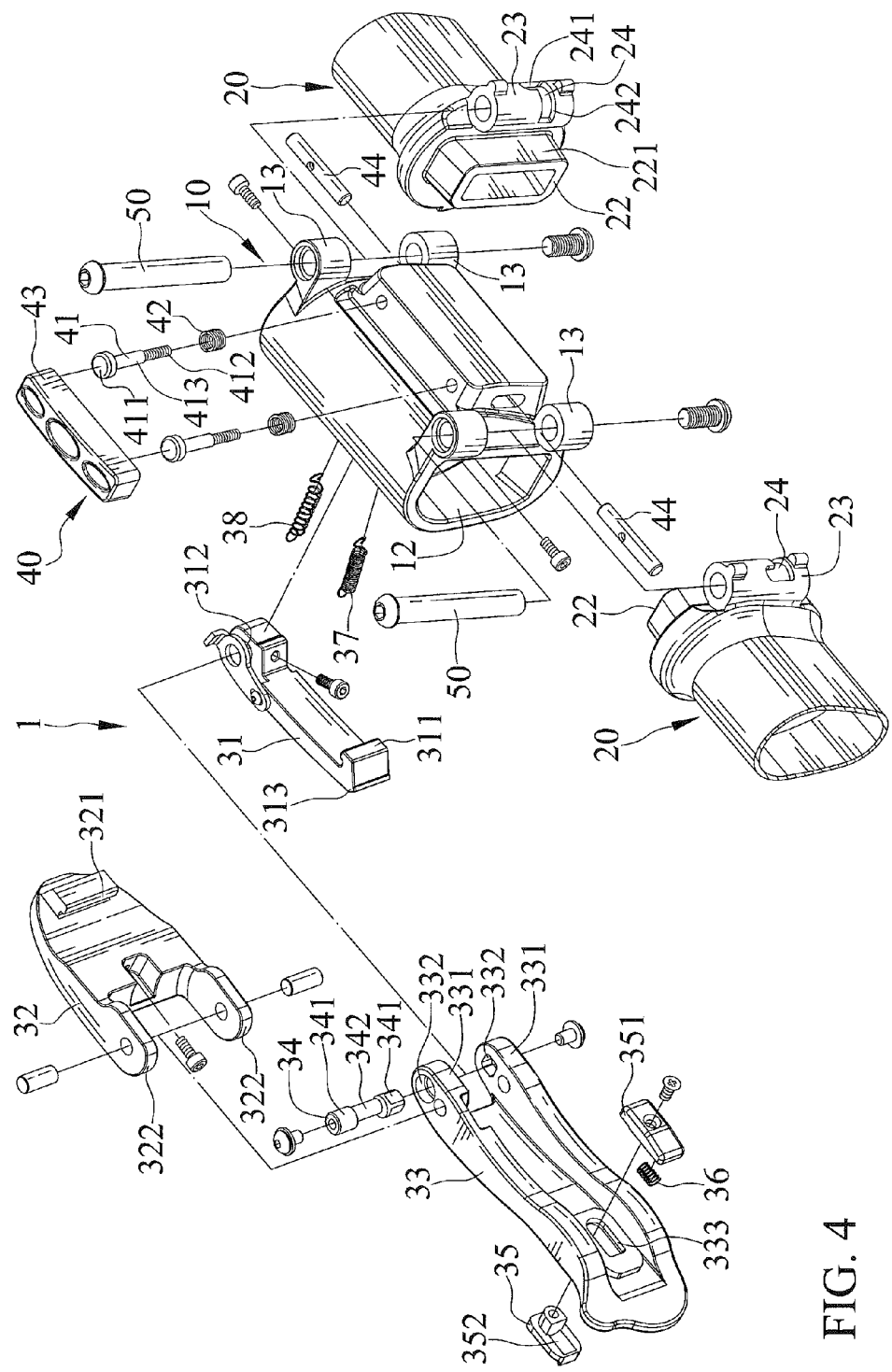
FIG. 4 shows another exploded view of the folding device of FIG. 2.
Figure 5:
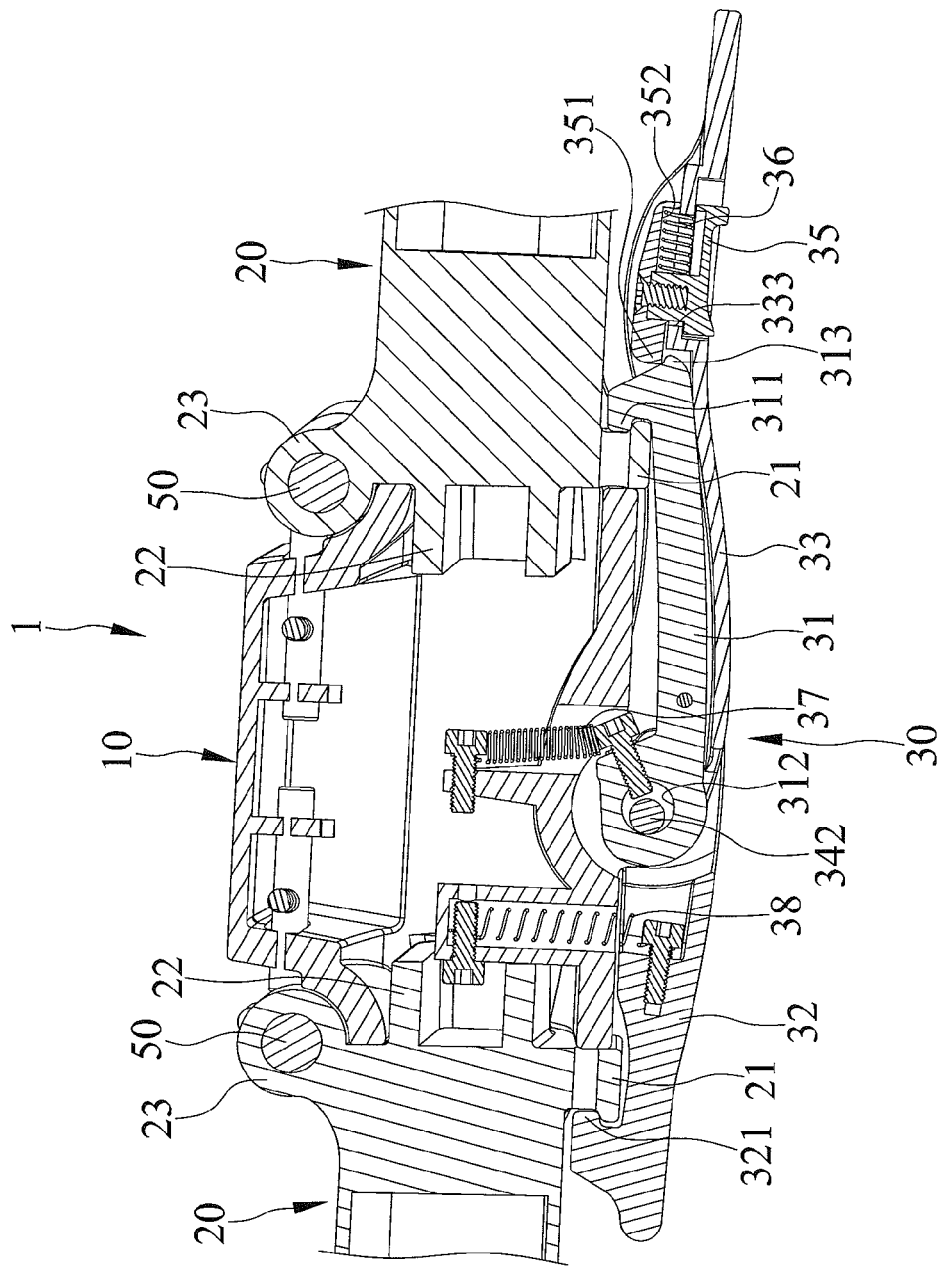
FIG. 5 shows a cross sectional view taken along line 5-5 of the folding device of FIG. 2 and illustrates a control member being in the locked position.
Figure 6:
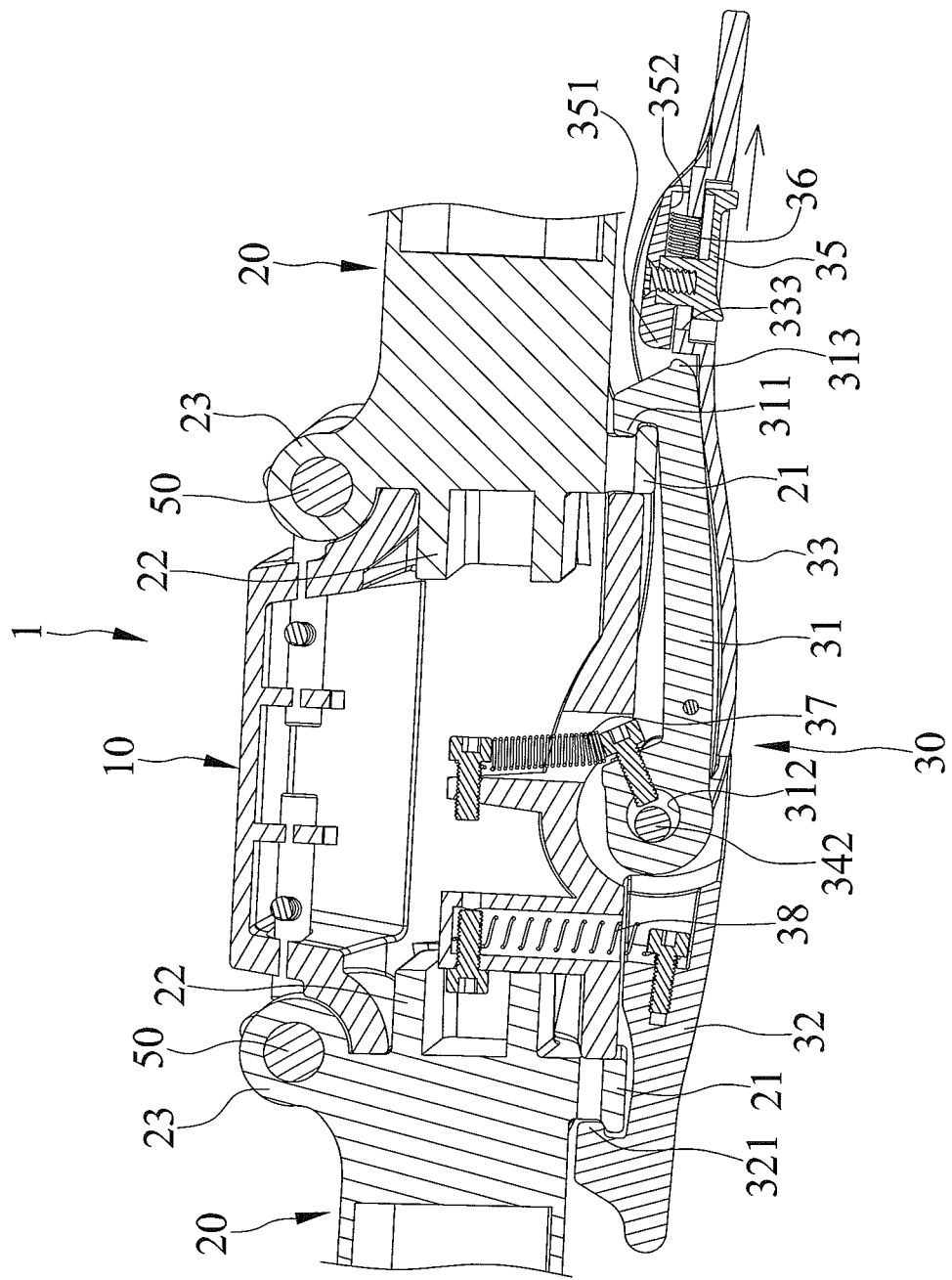
FIG. 6 shows a continued view of FIG. 5 and illustrates the control member being in the releasing position.
Figure 7:
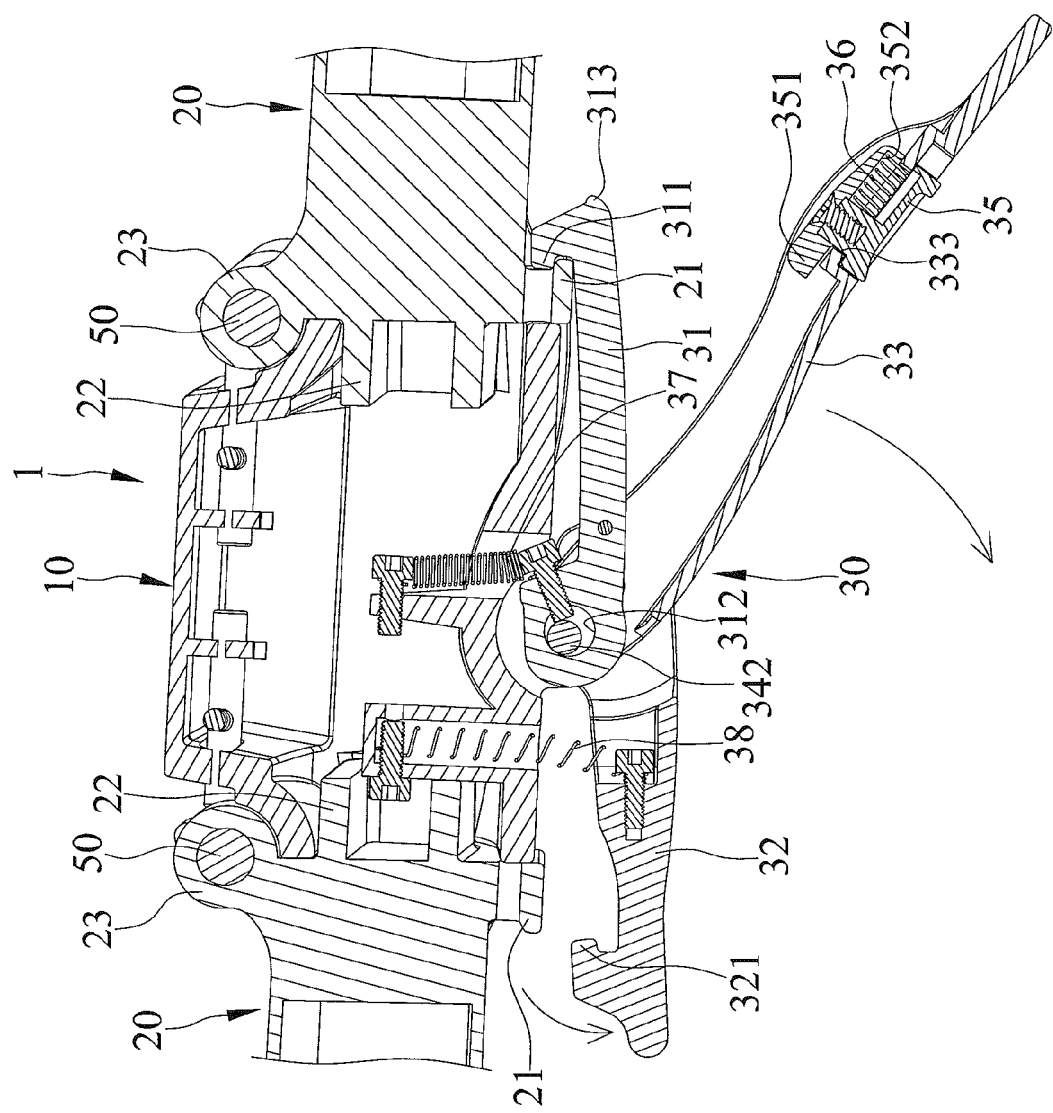
FIG. 7 shows a continued view of FIG. 6 and illustrates a second hooking member disengaged from one of two connecting members, and a lever and the second hooking member are pivoted with respect to a main body.
Figure 8:
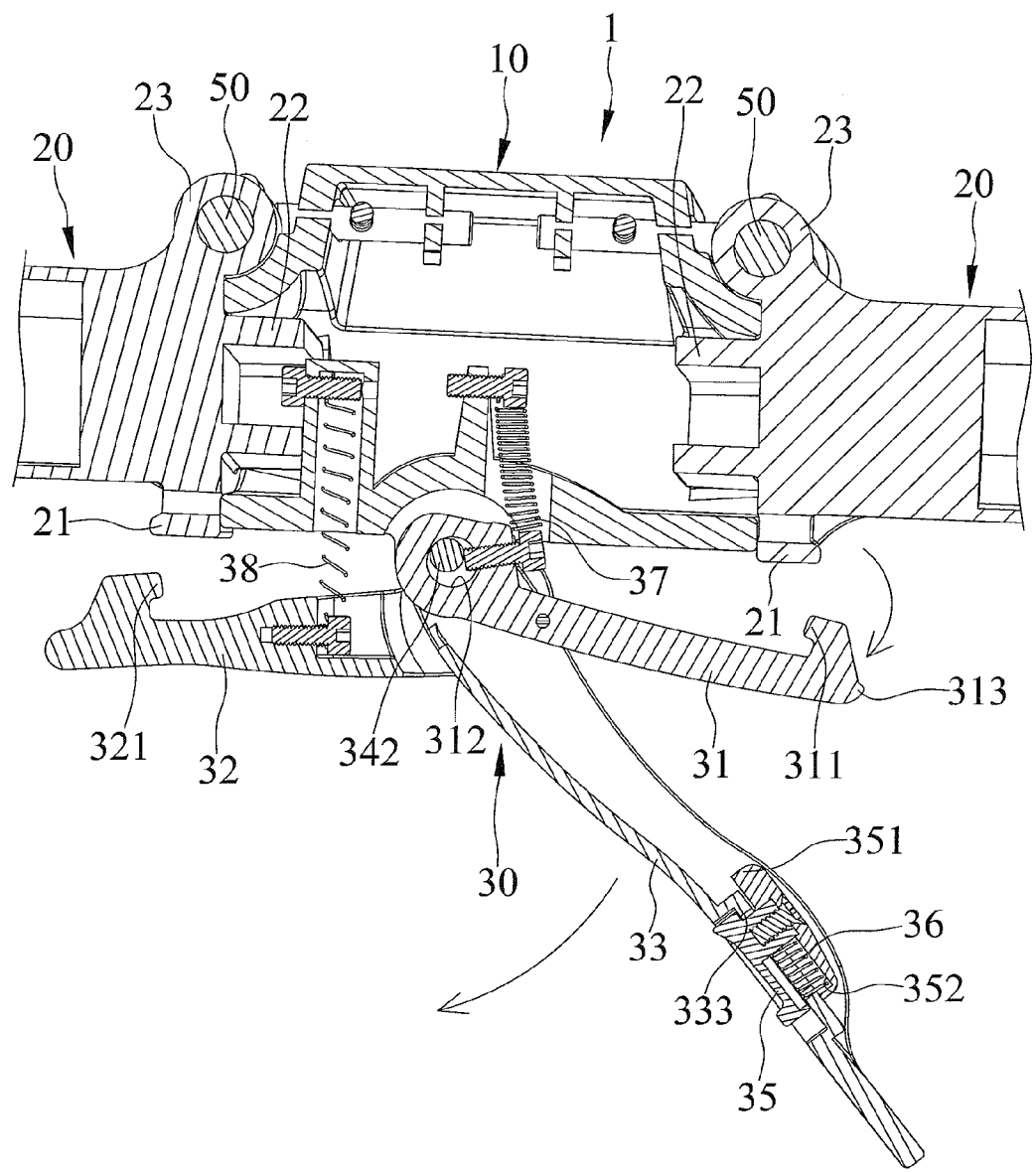
FIG. 8 shows a continued view of FIG. 7 and illustrates a first hooking member disengaged from the other connecting member.
Figure 9:
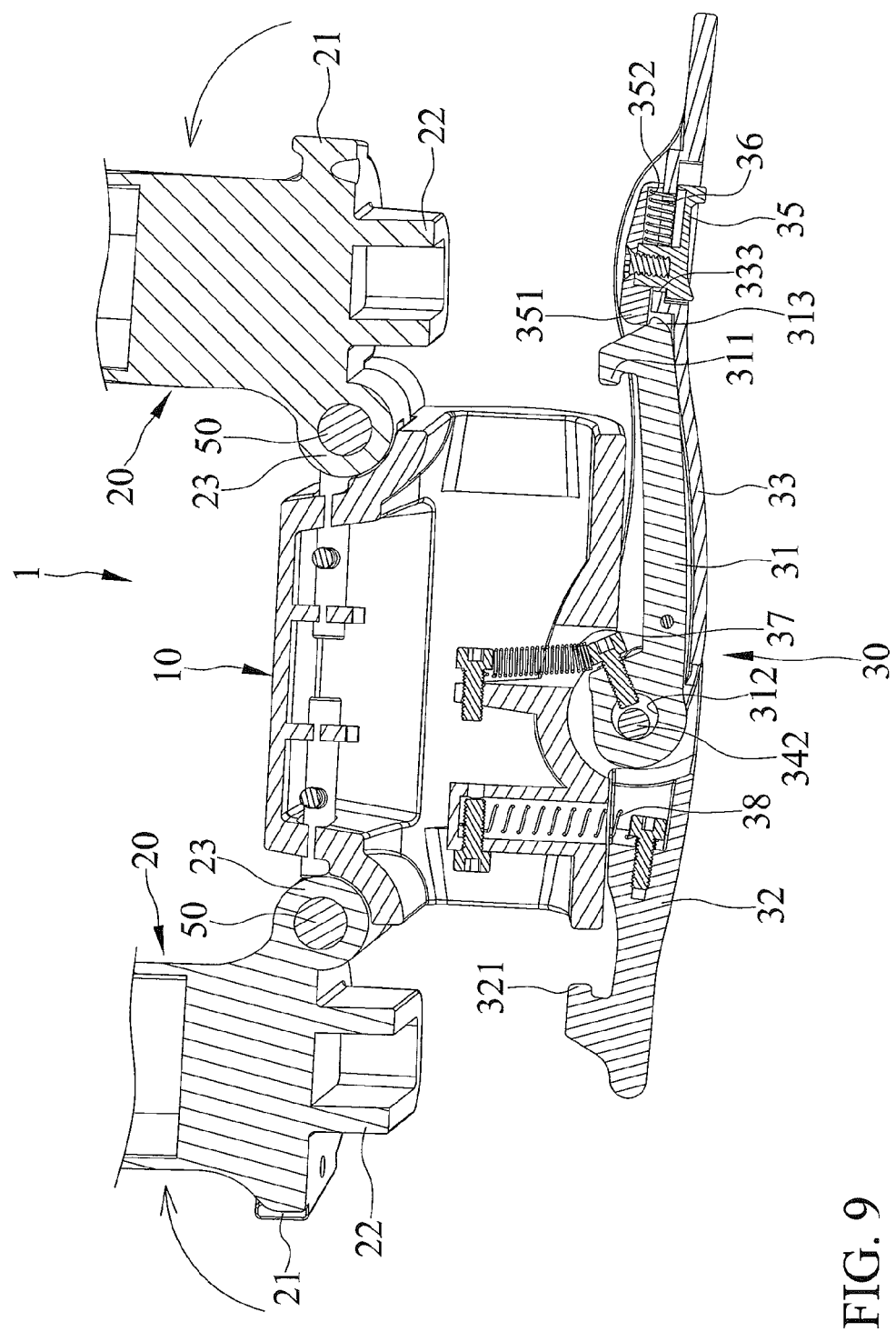
FIG. 9 shows a continued view of FIG. 8 and illustrates the two connecting members pivoted with respect to the main body.
Figure 10:
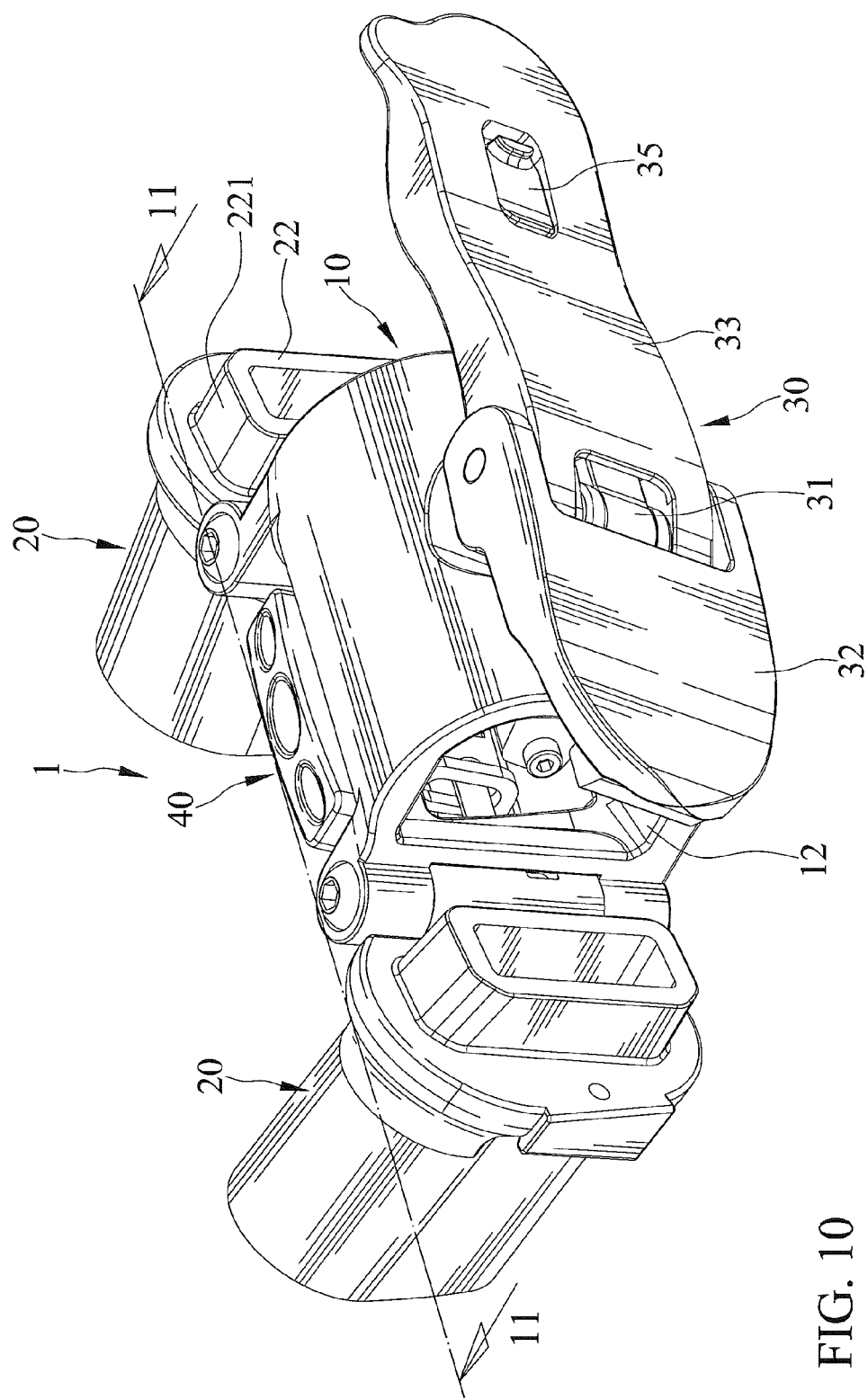
FIG. 10 shows another perspective view of the folding device in accordance with a first embodiment of the present invention and illustrates the two connecting members pivoted with respect to the main body.
Figure 11:
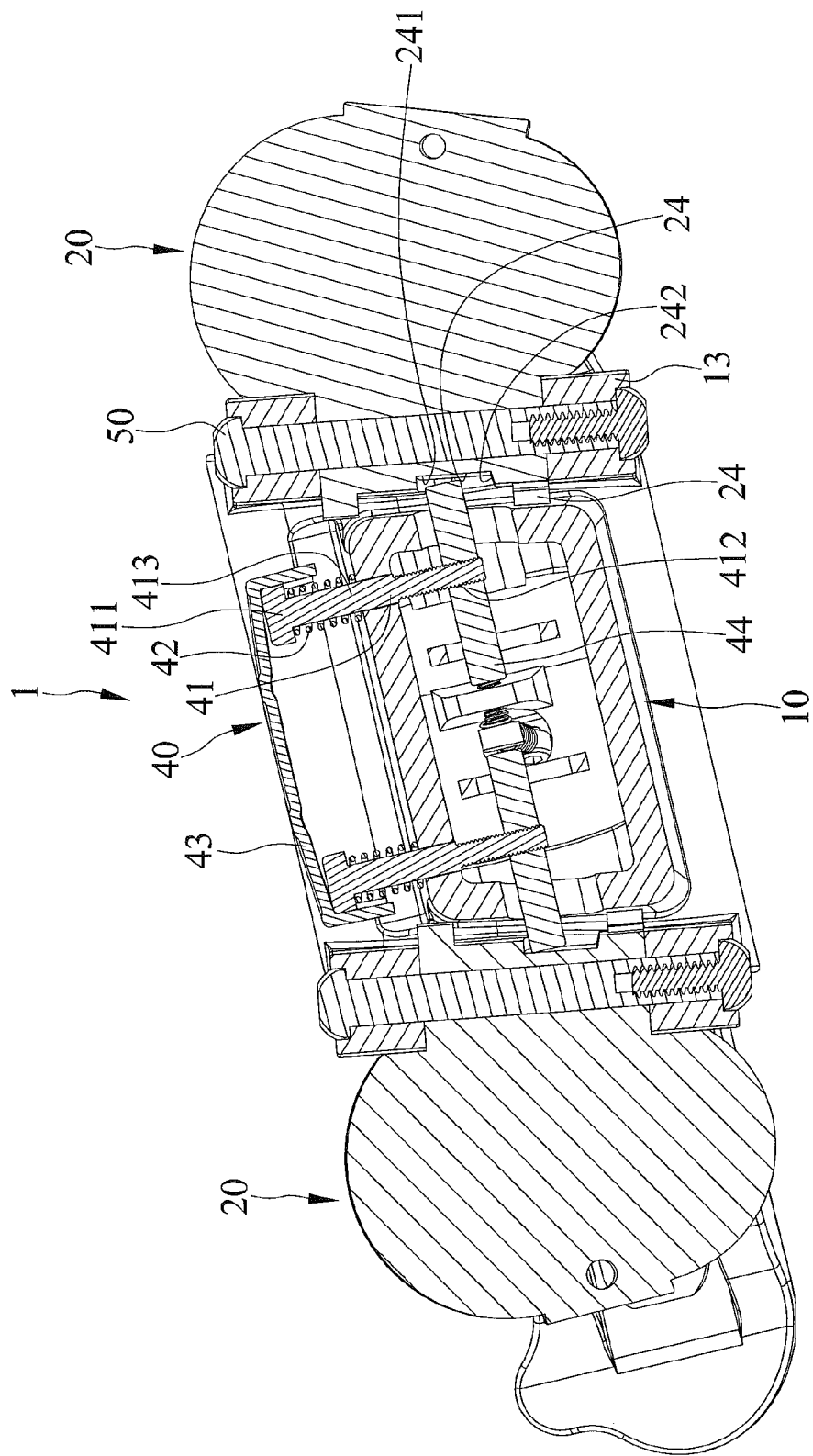
FIG. 11 shows a cross sectional view taken along line 11-11 of the folding device of FIG. 10 and illustrates two engaging members being in a first position.
Figure 12:
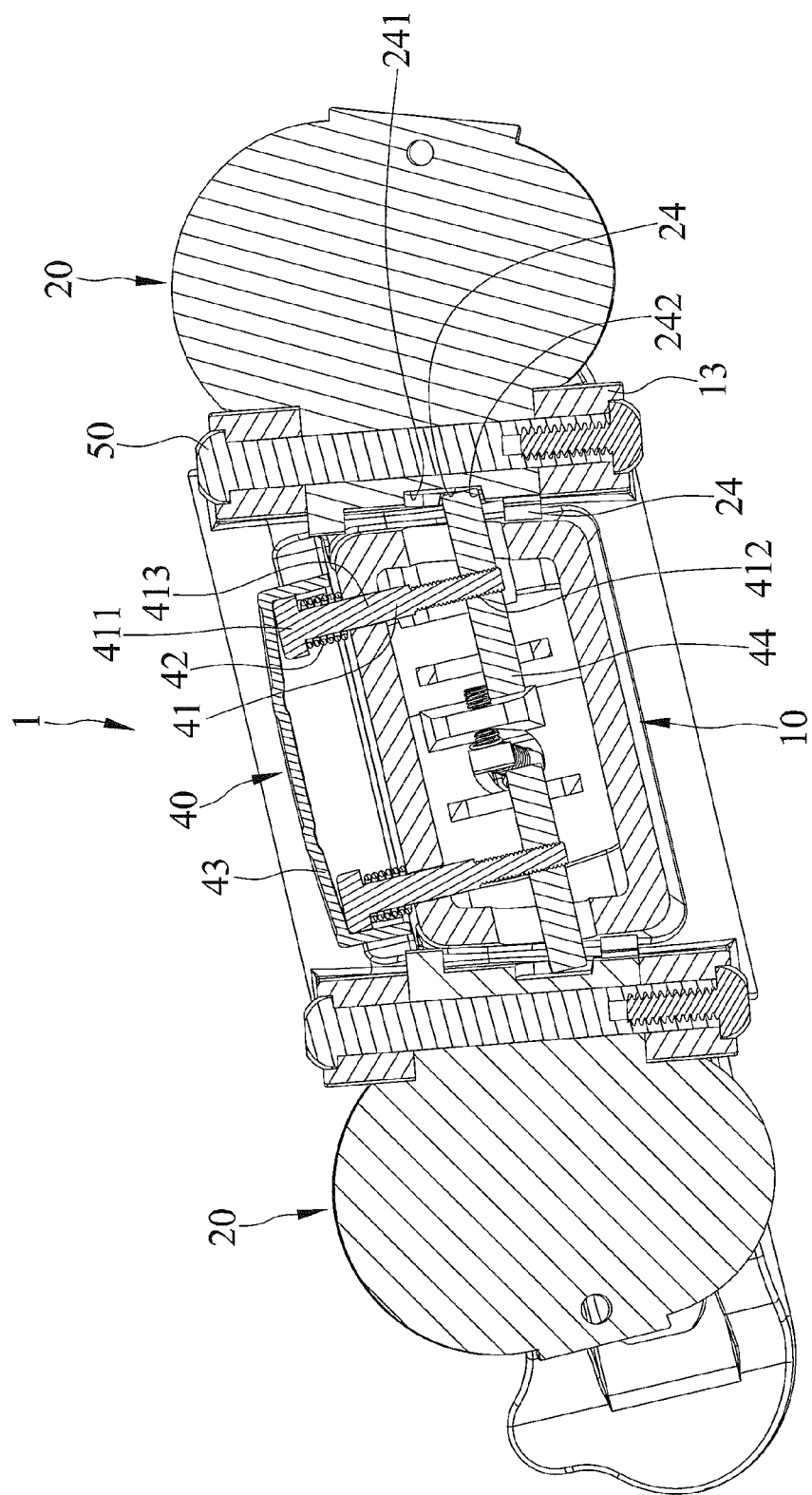
FIG. 12 shows a continued view of FIG. 11 and illustrates the two engaging members being in a second position.
Figure 13:
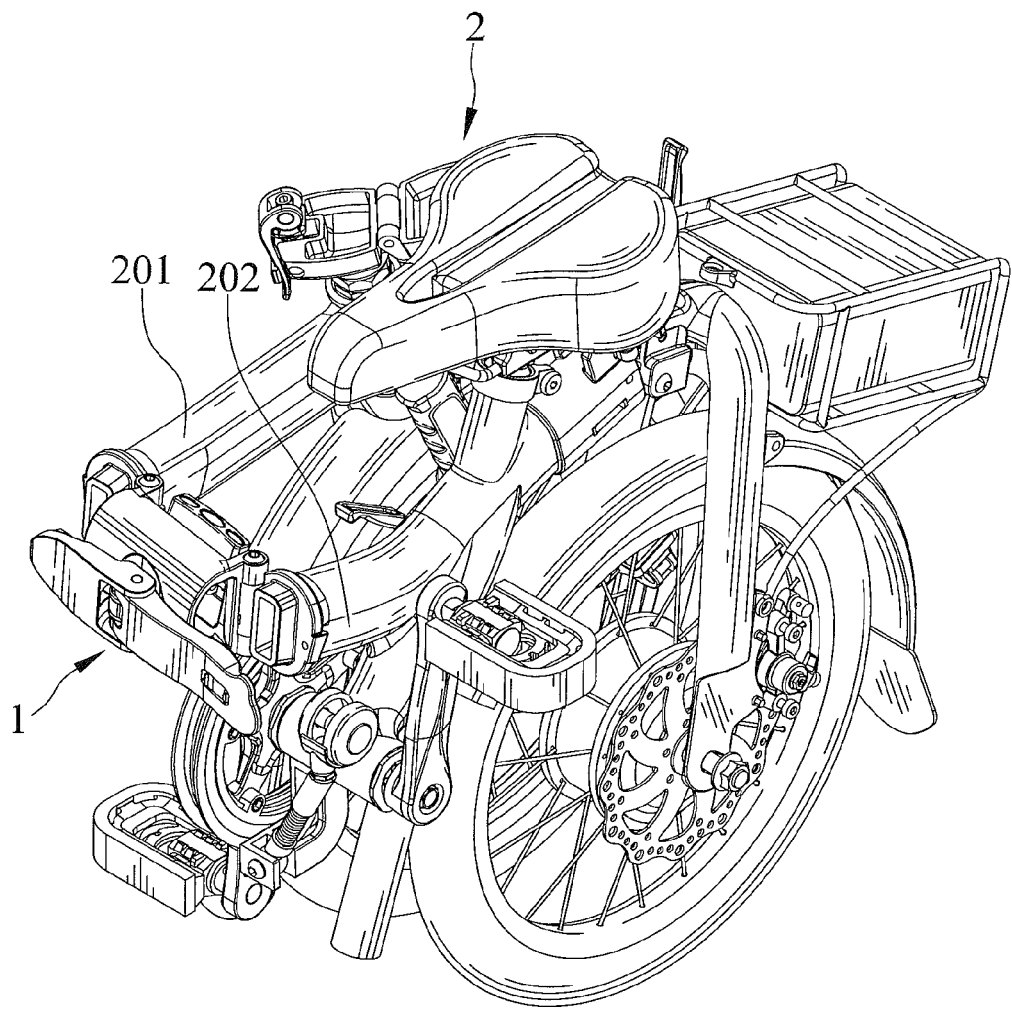
FIG. 13 shows a perspective view of the folding device of FIG. 1 and illustrates the folding device mounted on the folding bike which is in a folding state.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

FIG. 1 shows a folding device 1 in accordance with a first embodiment of the present invention and illustrates the folding device 1 to be mounted between front and rear frames 201 and 202 of a folding bike 2. Thus, the front and rear frames 201 and 202 of a folding bike 2 are pivotable each other to cause the folding bike 2 to be converted between unfolding and folding states.

FIGS. 2 through 13 show the folding device 1 in accordance with a first embodiment of the present invention. The folding device 1 includes a main body 10, two connecting members 20, a locking assembly 30 pivotally connected to the main body 10 and abuttable against the two connecting members 20, and a positioning assembly 40 mounted at the main body 10.

The main body 10 includes two first pivoting portions 11, two connecting holes 12, and four first lugs 13. The two first pivoting portions 11 are formed at a side wall thereof, and the two first pivoting portions 11 faced and corresponding to each other. The two connecting holes 12 are axially formed two opposite end faces of the main body 10 and interconnected each other. Preferably, an inter periphery of each of the two connecting holes 12 has a first abutting face 121 being an inclined surface. Two adjacent first lugs 13 are disposed at each end of the main body 10.

The two connecting members 20 are connected to the front and rear frames 201 and 202 of a folding bike 2 by welding, embedding, or such connection means. The two connecting members 20 are respectively pivotally connected to and abuttable against two opposite ends of the main body 10. Each of the two connecting members 20 includes an engaging portion 21 engageable with the locking assembly 30, a connecting portion 22, and a second lug 23. The connecting portion 22 is formed at an end face of each connecting member 20 adjacent to the main body 10. Preferably, an outer periphery of each of the two connecting portions 22 has a second abutting face 221. Each of the two connecting portions 22 is receivable in each of the two connecting holes 12. Further, the first and second abutting faces 121 and 221 are inclined faces and abuttable against each other. Thus, the first and second abutting faces 121 and 221 can be closely attached to each other to reduce a clearance between the main body 10 and the two connecting members 20 when the two connecting portions 22 is received in each of the two connecting holes 12. The second lug 23 of each connecting member 20 is disposed between the two first lugs 13 of each end of the main body 10. Two joining members 50 are respectively inserted through the second lug 23 of each of the two connecting members 20 and the two first lugs 13 of each end of the main body 10, so that the two connecting members 20 are respectively pivotally connected to and abuttable against two opposite ends of the main body 10.

The locking assembly 30 includes first and second hooking members 31 and 32, a lever 33, and an axial member 34. The first hooking member 31 and the lever 33 are respectively pivotally connected to the main body 10, and the axial member 34 is inserted through the main body 10, the first hooking member 31 and the lever 33, so that the first hooking member 31 and the lever 33 can co-axially pivot about the axial member 34. The second hooking member 32 is pivotally connected to an end of the lever 33 adjacent to the first hooking member 31.

The first hooking member 31 pivotally connected to the two first pivoting portions 11 of the main body 10 and includes a first hooking portion 311, an axial hole 312, and a first abutting portion 313. The first hooking portion 311 is formed at one end of the first hooking member 31 and engageable with the engaging portion 21 of one of the two connecting members 20. The axial hole 312 is formed another end of the first hooking member 31 opposite to the first hooking portion 311. The first abutting portion 313 is disposed at one end of the first hooking member 31 adjacent to the first hooking portion 311.

The second hooking member 32 includes a second hooking portion 321, and two second pivoting portions 322. The second hooking portion 321 is formed at one end of the second hooking member 32 opposite to the first hooking portion 311 and engageable with the engaging portion 21 of the other connecting member 20. The two second pivoting portions 322 are formed an end of the second hooking member 32 opposite to the second hooking portion 321.

The lever 33 is disposed between the two second pivoting portions 322, and the lever 33 is pivotable with respect to the main body 10 between locking and releasing positions. The lever 33 includes two third pivoting portions 331 disposed corresponding to the two first pivoting portions 11 of the main body 10. The first hooking member 31 is disposed between the two first pivoting portions 11, and the two first pivoting portions 11 are disposed between the two third pivoting portions 331. The lever 33 further includes two pivoting holes 332 each formed at each of the two third pivoting portions 331. The two fixed portions 341 of the axial member 34 are respectively inserted through the two pivoting holes 332, and more particular, a cross section of one of the two pivoting holes 332 and that of one of the two fixed portions 341 are noncircular and corresponded to each other.

When the two connecting members 20 are abutted against the main body 10, and the lever 33 is in the locking position, the engaging portion 21 of one of the two connecting members 20 is engaged with the first hooking portion 311 of the first hooking member 31, and the engaging portion 21 of the other connecting member 20 is engaged with the second hooking portion 321 of the second hooking member 32.

When the lever 33 is in the releasing position, the two engaging portions 21 of the two connecting members 20 are respectively disengaged from the first and second hooking portions 311 and 321 of the first and second hooking members 31 and 32. Thus, the two connecting members 20 can be pivotable with respect to the main body 10.

The axial member 34 includes two fixed portions 341 and an eccentric portion 342. The two fixed portions 341 are respectively disposed at two opposite ends of the axial member 34 and inserted through the lever 33. The eccentric portion 342 is connected between the two fixed portions 341 and inserted through the two first pivoting portions 11 and the first hooking member 31. Preferably, an outer diameter of the eccentric portion 342 is less than that of each fixed portion 341, and axes of each fixed portion 341 and the eccentric portion 342 are non-intersect. The eccentric portion 342 of the axial member 34 is mounted into the axial hole 312. An outer diameter of the eccentric portion 342 is less than an inner diameter of the axial hole 312.

Moreover, the locking assembly 30 further includes a control member 35 and a biasing member 36. The lever 33 has a sliding slot 333, and the control member 35 is slidably mounted in the sliding slot 333 and includes a second abutting portion 351 and a recess 352. The second abutting portion 351 is formed at on end of the lever 33 and abuttable against the first abutting portion 313 of the first hooking member 31. Further, the biasing member 36 is received within the recess 352 and biased against between an internal wall of the recess 352 and an internal wall of sliding slot 333 to cause the control member 35 being movable with respect to the lever 33 between locked and releasing positions.

When the control member 35 is in the locked position, the first abutting portion 313 is engaged with the second abutting portion 351 to cause the lever 33 unable to be pivoted with respect to the main body 10.

When the control member 35 is in the releasing position, the biasing member 36 is squeezed between the internal wall of the recess 352 and the internal wall of sliding slot 333 to cause the second abutting portion 351 to be disengaged from the first abutting portion 313. Thus, the lever 33 is pivotable with respect to the main body 10.

Moreover, a first spring 37 is mounted between the first hooking member 31 and the main body 10, and a second spring 38 is mounted between the second hooking member 32 and the main body 10.

Moreover, the positioning assembly 40 includes two rods 41, two coil spring 42, a cover 43, and two engaging members 44. The two rods 41 are respectively moveably inserted through the main body 10. The two coil spring 42 are respectively mounted around the two rods 41 and disposed between the two rods 41 and the main body 10. The cover 43 is abutted against ends of the two rods 41. The two engaging members 44 are respectively connected to an end of each rod 41 opposite to the cover 43. Each of the two connecting members 20 includes a guiding slot 24 formed at the second lug 23.

Furthermore, each of the two engaging members 44 is slidaly engaged into the guiding slot 24 of each of the two connecting members 20 and movable between first and second positions. The guiding slot 24 of each of the two connecting members 20 includes first and second guiding sections 241 and 242 respectively formed therein and connected each other. Preferably, extending directions of the first and second guiding sections 241 and 242 are substantially perpendicular to each other.

When each of the two engaging members 44 is in the first position, each of the two engaging members 44 is disposed and engaged in the first guiding section 241 of each of the two guiding slots 24. Therefore, the two connecting members 20 are positioned to the main body 10.

A user can press the cover 43 to cause the two rods 41 longitudinally moved with respect to the main body 10. Thus, each of the two engaging members 44 is converted from the first position to the second position.

When each of the two engaging members 44 is in the second position, each of the two engaging members 44 is moved from the first guiding section 241 of each of the two guiding slots 24 to the second guiding section 242 of each of the two guiding slots 24. Thus, the two connecting members 20 are pivotable with respect to the main body 10.

Additionally, each of the two rods 41 includes a limiting portion 411, a linking portion 412, and a body portion 413. The limiting and linking portions 411 and 412 are respectively disposed at opposite ends of each of the two rods 41 and both have circular cross sections. The body portion 413 is connected between the limiting and linking portions 411 and 412. An outer diameter of the limiting portion 411 is greater than that of the linking portion 412 and that of the body portion 413. In this embodiment, the two coil spring 42 are respectively mounted around the body portions 413 of the two rods 41. The cover 43 is abutted against the limiting portion 411 of each of the two rods 41.

The two engaging members 44 are respectively connected to an end of each rod 41 opposite to the cover 43. The two engaging members 44 are respectively connected to the linking portion 412 of each rod 41. Thus, the each engaging member 44 is substantially perpendicular to each rod 41.

Figure 14:
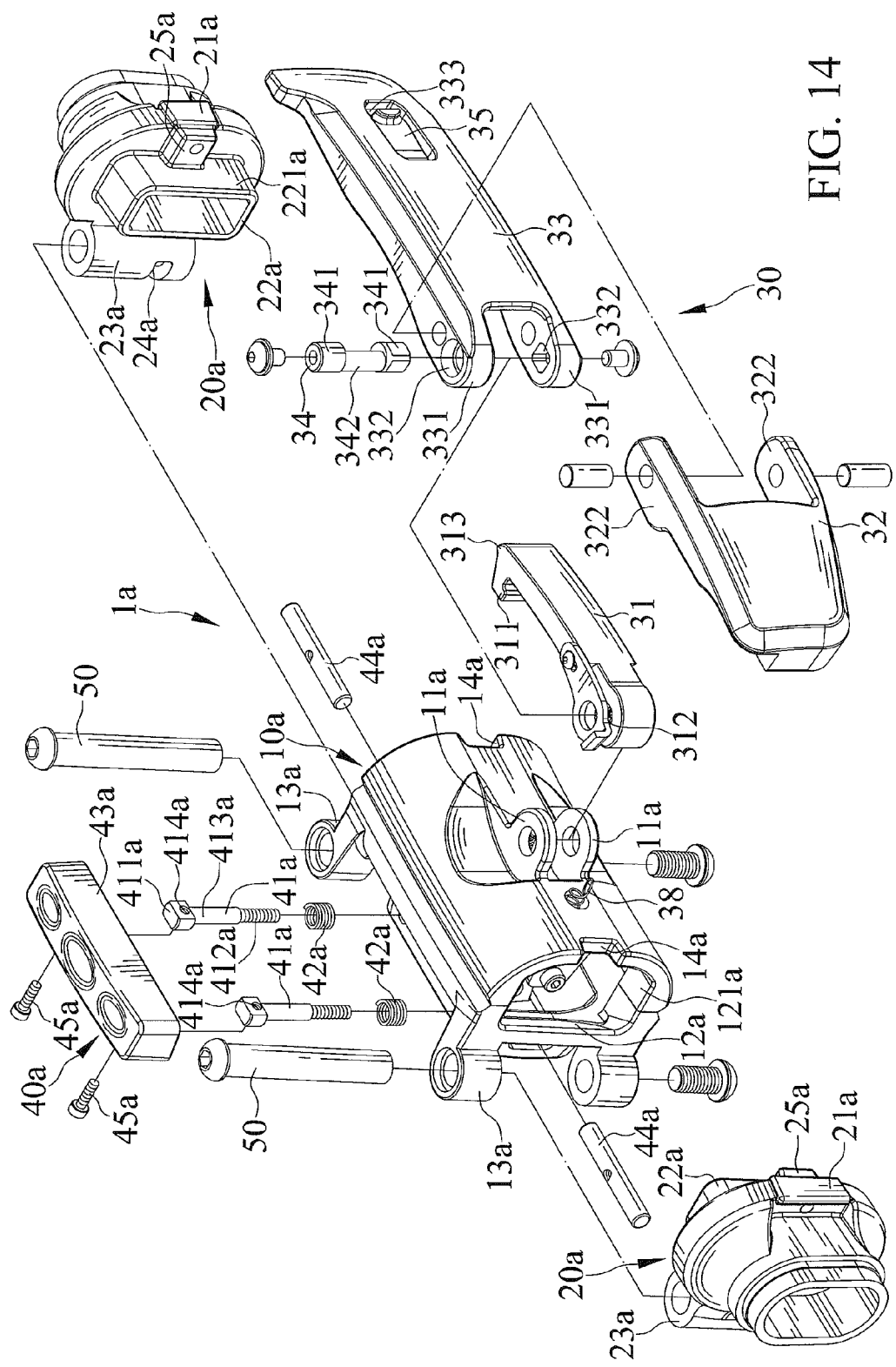
FIG. 14 shows a perspective view of a folding device in accordance with a second embodiment of the present invention.
Figure 15:
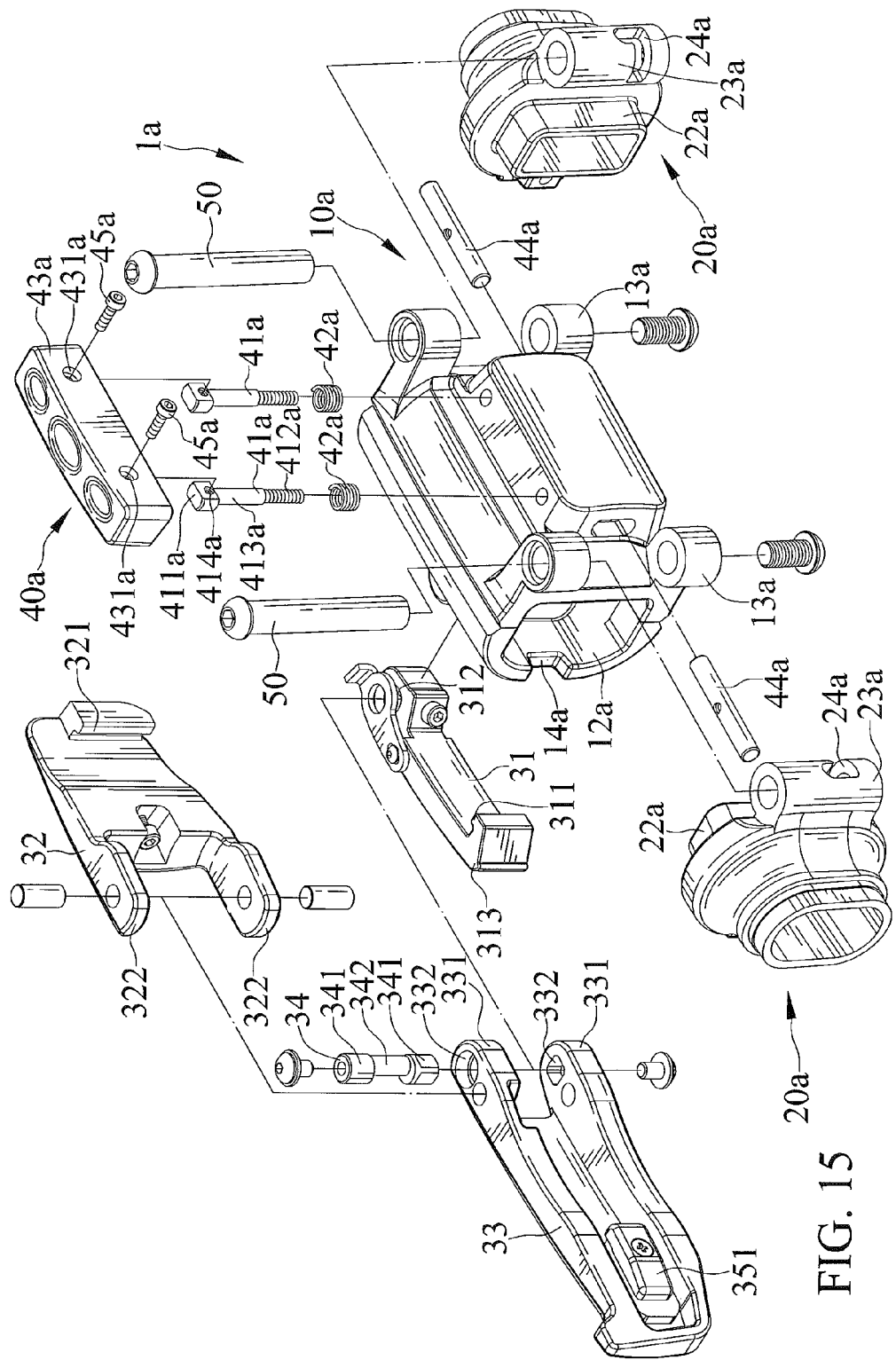
FIG. 15 shows another perspective view of the folding device of FIG. 14.
Figure 16:
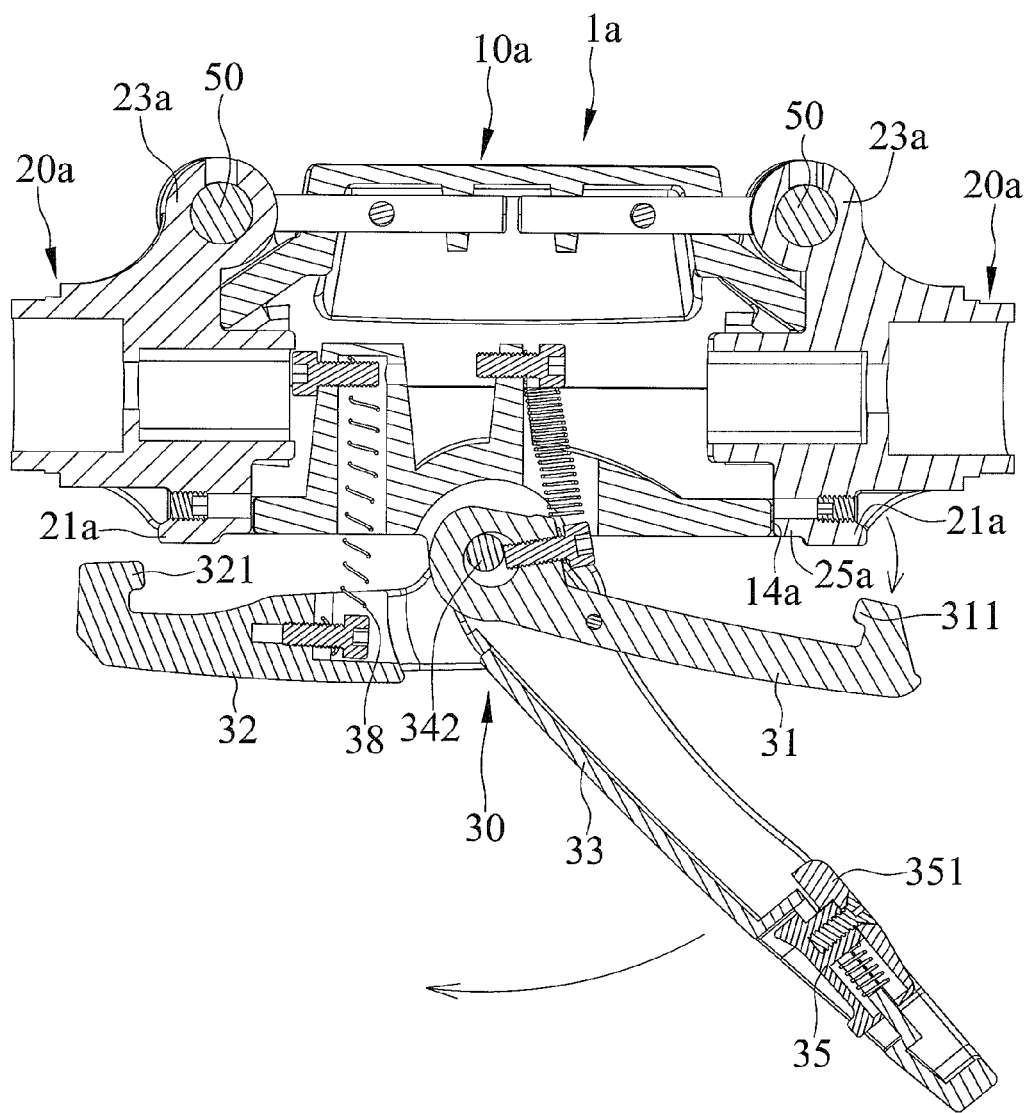
FIG. 16 shows a cross sectional view of the folding device of FIG. 14 and illustrates a second hooking member disengaged from one of two connecting members.
Figure 17:
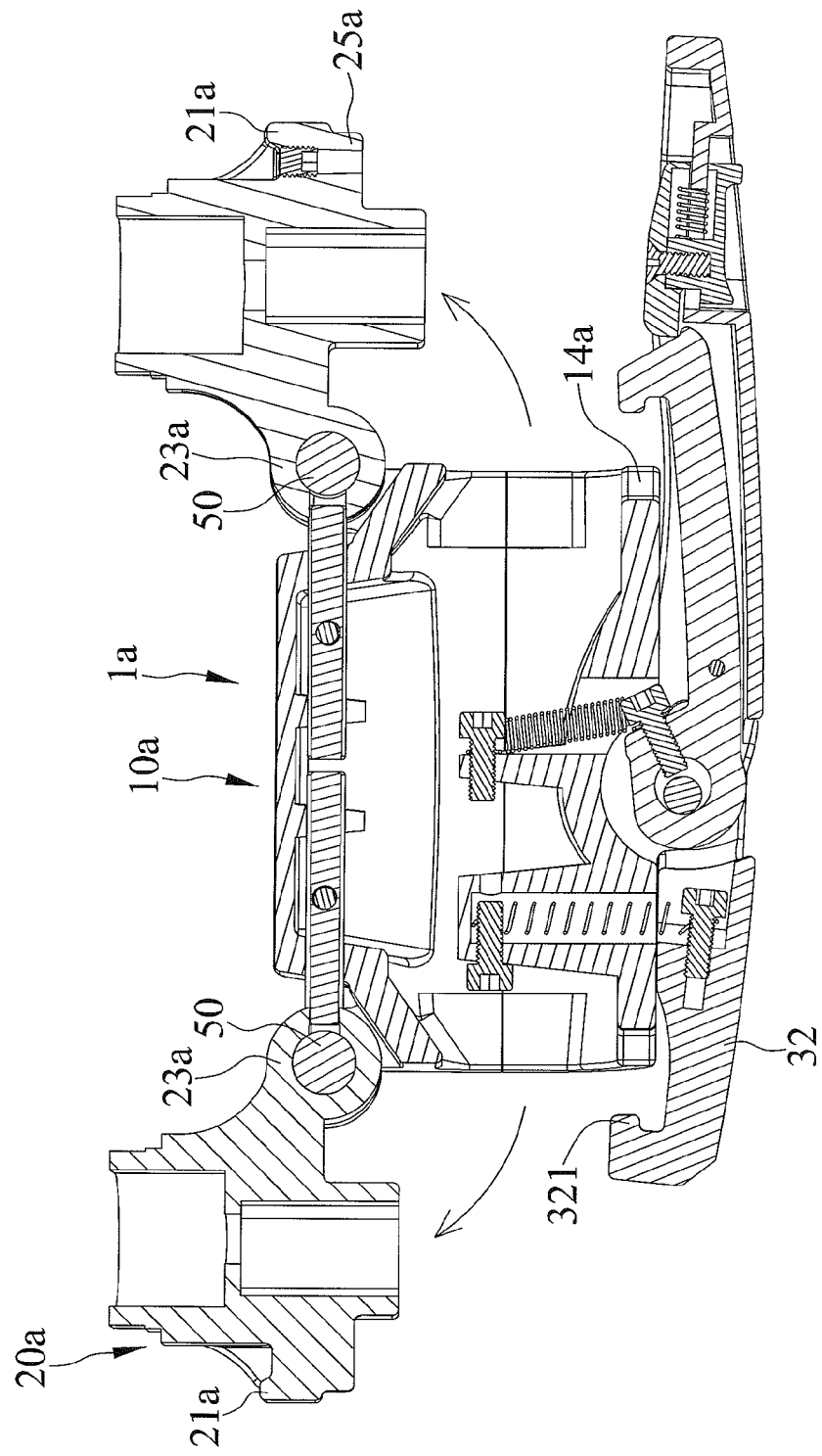
FIG. 17 shows a continued view of FIG. 16 and illustrates the two connecting members pivoted with respect to a main body.

FIGS. 14 and 17 show a folding device in accordance with a second embodiment of the present invention. The structure of the folding device of the second embodiment is substantially similar to that of the first embodiment except that the main body 10a includes two first pivoting portions 11a, two connecting holes 12a, four first lugs 13a, and two positioning recesses 14a. The two first pivoting portions 11a are formed at a side wall thereof, and the two first pivoting portions 11a faced and corresponding to each other. The two connecting holes 12a are axially formed two opposite end faces of the main body 10a and interconnected each other. Preferably, an inter periphery of each of the two connecting holes 12a has a first abutting face 121a being an inclined surface. Two adjacent first lugs 13a are disposed at each end of the main body 10. Each positioning recess 14a is connected with each of the two connecting holes 12a.

Each of the two connecting members 20a includes an engaging portion 21a engageable with the locking assembly 30, a connecting portion 22a, a second lug 23a, and a positioning portion 25a engageable with the positioning recess 14a of each end of the main body 10a. The connecting portion 22a is formed at an end face of each connecting member 20a adjacent to the main body 10a. Preferably, an outer periphery of each of the two connecting portions 22a has a second abutting face 221a. Each of the two connecting portions 22a is receivable in each of the two connecting holes 12a. Further, the first and second abutting faces 121a and 221a are inclined faces and abuttable against each other. Thus, the first and second abutting faces 121a and 221a can be closely attached to each other to reduce a clearance between the main body 10a and the two connecting members 20a when the two connecting portions 22a is received in each of the two connecting holes 12a. The second lug 23a of each connecting member 20a is disposed between the two first lugs 13a of each end of the main body 10a. Two joining members 50 are respectively inserted through the second lug 23a of each of the two connecting members 20a and the two first lugs 13a of each end of the main body 10a, so that the two connecting members 20a are respectively pivotally connected to and abuttable against two opposite ends of the main body 10a.

The positioning portion 25a is formed at one end face of each connecting member 20a and radially extended from each connecting portion 22a to each engaging portion 21a. Preferably, each positioning recess 14a and each positioning portion 25a have rectangular cross sections and corresponding to each other and engageable with each other. When the two connecting members 20a are pivotally abutted against the two opposite ends of the main body 10a, the positioning portion 25a of each of the two connecting members 20a is engaged into the positioning recess 14a of each end of the main body 10a. Thus, the two connecting members 20a closely connected to the main body 10a.

The positioning assembly 40a includes two rods 41a, two coil spring 42a, a cover 43a, two engaging members 44a, and two fixed members 45a.

Each of the two rods 41a is respectively moveably inserted through the main body 10a and includes a limiting portion 411a, a linking portion 412a, a body portion 413a, and a fixed hole 414a. The limiting and linking portions 411a and 412a are respectively disposed at opposite ends of each of the two rods 41a. The limiting portion 411a has a rectangular cross section, and the linking and body portions 412a and 413a both have circular cross sections. The body portion 413a is connected between the limiting and linking portions 411a and 412a. The two coil spring 42a are respectively mounted around the body portions 413a of the two rods 41a. The fixed hole 414a is formed at the limiting portion 411a. The cover 43a includes two through holes 431a formed therethrough. Two fixed members 45a are respectively inserted through the two through holes 431a and fixed into the two fixed holes 414a. The two engaging members 44a are respectively connected to the linking portion 412a of each rod 41a. Thus, the each engaging member 44a is substantially perpendicular to each rod 41a. Each of the two connecting members 20 includes a guiding slot 24a formed at the second lug 23a. Furthermore, each of the two engaging members 44a is slidaly engaged into the guiding slot 24a of each of the two connecting members 20a and movable between first and second positions.

In view of the forgoing, it is an object of the present invention to provide a folding device 1 or 1a, which has simple structure and provides higher connection strength between the main body 10 or 10a and the two connecting members 20 or 20a.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A folding device comprising:
a main body;
two connecting members respectively pivotally connected to and abuttable against two opposite ends of the main body, with each of the two connecting members including an engaging portion; and
a locking assembly including first and second hooking members, a lever, and an axial member, with the first hooking member and the lever pivotally connected to the main body, with the axial member inserted through the main body, the first hooking member and the lever, with the second hooking member pivotally connected to the lever, with the first hooking member including a first hooking portion, with the second hooking member including a second hooking portion, with the lever pivotable with respect to the main body between locking and releasing positions;
wherein when the two connecting members are abutted against the main body, and the lever is in the locking position, the engaging portion of one of the two connecting members is engaged with the first hooking portion of the first hooking member, and the engaging portion of the other connecting member is engaged with the second hooking portion of the second hooking member;
wherein when the lever is in the releasing position, the two engaging portions of the two connecting members are respectively disengaged from the first and second hooking portions.

2. The folding device as claimed in claim 1, wherein the main body includes two first pivoting portions, wherein the axial member includes two fixed portions and an eccentric portion, with the two fixed portions disposed at two opposite ends of the axial member and inserted through the lever, with the eccentric portion connected between the two fixed portions and inserted through the two first pivoting portions and the first hooking member.

3. The folding device as claimed in claim 2, wherein the first hooking member includes an axial hole, with the eccentric portion of the axial member mounted into the axial hole, with an outer diameter of the eccentric portion less than an inner diameter of the axial hole.

4. The folding device as claimed in claim 3, wherein the locking assembly further includes a control member and a biasing member, wherein the first hooking member has a first abutting portion disposed at one end thereof opposite to the axial hole, wherein the lever has a sliding slot, with the control member slidably mounted in the sliding slot and including a second abutting portion and a recess, with the second abutting portion abuttable against the first abutting portion, with the biasing member received within the recess and biasing between an internal wall of the recess and an internal wall of sliding slot, wherein the control member movable with respect to the lever between locked and releasing positions;
wherein when the control member is in the locked position, the first abutting portion is engaged with the second abutting portion to cause the lever unable to pivot with respect to the main body;
wherein when the control member is in the releasing position, the biasing member is squeezed and the second abutting portion disengaged from the first abutting portion to cause the lever pivotable with respect to the main body.

5. The folding device as claimed in claim 2, wherein the lever includes two third pivoting portions disposed corresponding to the two first pivoting portions of the main body, with the first hooking member disposed between the two first pivoting portions, with the two first pivoting portions disposed between the two third pivoting portions.

6. The folding device as claimed in claim 5, wherein the second hooking member includes two second pivoting portions, with the lever disposed between the two second pivoting portions.

7. The folding device as claimed in claim 5, wherein the lever includes two pivoting holes each formed at each of the two third pivoting portions, with the two fixed portions of the axial member inserted through the two pivoting holes, wherein a cross section of one of the two pivoting holes and a cross section of one of the two fixed portions are noncircular and corresponded to each other.

8. The folding device as claimed in claim 1, wherein the main body includes two connecting holes, wherein each of the two connecting members has a connecting portion disposed at an end face thereof adjacent to the main body, wherein an inter periphery of each of the two connecting holes has a first abutting face, wherein an outer periphery of each of the two connecting portions has a second abutting face, wherein the first and second abutting faces are inclined faces and abuttable against each other, with each of the two connecting portions receivable in each of the two connecting holes.

9. The folding device as claimed in claim 1, wherein each end of the main body has a positioning recess connected with each of the two connecting holes, wherein each of the two connecting members has a positioning portion engageable with the positioning recess of each end of the main body, wherein when the two connecting members are pivotally abutted against the two opposite ends of the main body, the positioning portion of each of the two connecting members is engaged into the positioning recess of each end of the main body.

10. The folding device as claimed in claim 1, wherein a first spring is mounted between the first hooking member and the main body, and wherein a second spring is mounted between the second hooking member and the main body.

11. The folding device as claimed in claim 1, wherein the main body has two first lugs disposed at each end thereof, wherein each of the two connecting members has a second lug disposed between the two first lugs of each end of the main body, wherein two joining members are respectively inserted through the second lug of each of the two connecting members and the two first lugs of each end of the main body.

12. The folding device as claimed in claim 11 further includes a positioning assembly, wherein the positioning assembly includes two rods, two coil spring, a cover, and two engaging members, with the two rods respectively moveably inserted through the main body, with the two coil spring respectively mounted around the two rods and disposed between the two rods and the main body, with the cover abutted against ends of the two rods, with the two engaging members connected to an end of each of the two rods opposite to the cover, wherein each of the two connecting members includes a guiding slot, with each of the two engaging members is slidaly engaged into the guiding slot of each of the two connecting members and movable between first and second positions.

13. The folding device as claimed in claim 12, wherein the guiding slot includes first and second guiding sections formed therein and connected each other, with extending directions of the first and second guiding sections perpendicular to each other;
  wherein when each of the two engaging members is in the first position, each of the two engaging members is disposed in the first guiding section of each of the two guiding slots, with the two connecting members positioned to the main body;
  wherein when each of the two engaging members is in the second position, each of the two engaging members is disposed in the second guiding section of each of the two guiding slots, with the two connecting members pivotable with respect to the main body.

14. The folding device as claimed in claim 12, wherein each of the two rods includes a limiting portion, a linking portion, a body portion, and a fixed hole, with the limiting and linking portions disposed at opposite ends of each of the two rods, with the body portion connected between the limiting and linking portions, with the fixed hole formed at the limiting portion, wherein the cover includes two through holes formed therethrough, and wherein two fixed members are respectively inserted through the two through holes and fixed into the two fixed holes.

\* \* \* \* \*